(12) United States Patent
Hillmann

(10) Patent No.: US 7,130,456 B2
(45) Date of Patent: Oct. 31, 2006

(54) METHOD AND ARRANGEMENT FOR LOW-DISTORTION RECORDING OF INTENSITY PATTERNS OCCURRING ON A CONTACT SURFACE THROUGH FRUSTRATED TOTAL REFLECTION

(75) Inventor: Juergen Hillmann, Jena (DE)

(73) Assignee: Smiths Heimann Biometrics GnbH, Jena (DE)

( * ) Notice: Subject to any disclaimer, the term of this patent is extended or adjusted under 35 U.S.C. 154(b) by 859 days.

(21) Appl. No.: 10/319,178

(22) Filed: Dec. 13, 2002

(65) Prior Publication Data

US 2003/0111534 A1 Jun. 19, 2003

(30) Foreign Application Priority Data

Dec. 14, 2004 (DE) ................. 101 63 351

(51) Int. Cl.
*G06K 9/00* (2006.01)

(52) U.S. Cl. .............. 382/127; 382/312; 235/454

(58) Field of Classification Search ........... 382/124, 382/127, 312, 324, 300; 235/454; 348/207.99, 348/147; 359/15, 700.71; 356/71
See application file for complete search history.

(56) References Cited

U.S. PATENT DOCUMENTS

| 5,650,842 | A |   | 7/1997 | Maase et al. |
| 5,796,426 | A |   | 8/1998 | Gullichsen et al. |
| 5,796,858 | A | * | 8/1998 | Zhou et al. ........... 382/127 |
| 5,892,599 | A |   | 4/1999 | Bahuguna |

(Continued)

FOREIGN PATENT DOCUMENTS

DE 196 30 009 1/1998

(Continued)

OTHER PUBLICATIONS

Stoltzmann et al., "Versatile anamorphic electronic fingerprinting: Design and manufacturing considerations", *SPIE*, vol. 2537, Aug. 1995, 105-116.

(Continued)

*Primary Examiner*—Yon J. Couso
(74) *Attorney, Agent, or Firm*—Reed Smith LLP

(57) ABSTRACT

A method and an arrangement for recording intensity patterns occurring on a contact surface by frustrated total reflection, particularly for low-distortion recording of relatively large-area fingerprints, handprints or footprints or other parts of the skin. It is an object of the invention to find a novel possibility for recording intensity patterns occurring on a support surface according to the principle of frustrated total reflection which achieves a high-resolution, low-distortion image of the intensity pattern using simple optical arrangements. This object is met, according to the invention, in that a support surface for the measurement object is illuminated homogeneously by a light source at an angle of total reflection, an image of the support surface is imaged on the image sensor as an intensity pattern only by of an imaging optical system, so that the image is imaged on the image sensor so as to be distorted but sharp in all parts of the image, and light from the light source which is totally reflected at the support surface enters parallel to the axis of the optical system, the image of the support surface is scanned by the image sensor with substantially more image elements (pixels) than those required for the desired resolution in the output-side final image of the intensity pattern, and the optoelectronically converted, trapezoidally distorted image is rectified by displacement, interpolation and averaging operations based on the generation of combined pixel data from a data surplus occurring as a result of the increased quantity of recorded pixels compared to the necessary quantity of pixels in the final image.

27 Claims, 6 Drawing Sheets

U.S. PATENT DOCUMENTS

| | | |
|---|---|---|
| 5,900,993 A | 5/1999 | Betensky |
| 6,414,749 B1 * | 7/2002 | Okamoto et al. .............. 356/71 |
| 6,917,695 B1 * | 7/2005 | Teng et al. ................. 382/126 |

FOREIGN PATENT DOCUMENTS

| | | |
|---|---|---|
| DE | 198 04 129 | 8/1999 |
| DE | 100 20 260 | 10/2001 |
| EP | 0 308 162 | 3/1989 |
| EP | 0375053 | 6/1990 |

OTHER PUBLICATIONS

R. T. Hebert, "Off-axis optical elements in integrated, injection-molded assemblies", *SPIE*, vol. 2600, Dec. 1995, 129-134.

"Prism fingerprint sensor that uses a holographic optical element", *Applied Optics*, vol. 35, Sep. 1996, 5242-5245.

* cited by examiner

1st scanning step

2nd scanning step

3rd scanning step

4th scanning step image interlaced in image storage

METHOD AND ARRANGEMENT FOR LOW-DISTORTION RECORDING OF INTENSITY PATTERNS OCCURRING ON A CONTACT SURFACE THROUGH FRUSTRATED TOTAL REFLECTION

CROSS-REFERENCE TO RELATED APPLICATION

This application claims priority of German Application No. 101 63 351.3, filed Dec. 14, 2001, the complete disclosure of which is hereby incorporated by reference.

BACKGROUND OF THE INVENTION a) Field of the Invention

The invention is directed to a method and an arrangement for recording intensity patterns occurring on a contact surface by means of frustrated total reflection, particularly for low-distortion recording of relatively large-area fingerprints, handprints or footprints or other parts of the skin.

b) Description of the Related Art

In known devices for taking fingerprint images and handprint images which work by total internal reflection (TIR) on prisms, a perspective imaging of the contact surface or support surface in which the image of the impression is distorted trapezoidally and highly compressed in one direction requires correction in order to achieve the same resolution and the same imaging scale at all locations in the image for the imaging of a given rectangular support surface on a (usually square) area sensor.

A number of possibilities for correcting this distortion have been disclosed:

additional prisms for canceling the perspective distortion and adapting the imaging scale in horizontal and vertical direction (e.g., U.S. Pat. No. 5,650,842 or EP 0 308 162 A2), telecentric imaging optics, also in combination with cylindrical lenses, for adapting the imaging scale in horizontal and vertical direction (e.g., U.S. Pat. No. 5,900,993), holographic surfaces (e.g., U.S. Pat. No. 5,892,599), cylindrical lens systems, although these are not suitable for forensic applications due to insufficient possibilities for correction (see, e.g., Stoltzmann et al., "Versatile anamorphic electronic fingerprinting: Design and manufacturing considerations", *SPIE*, vol. 2537, Aug. 1995, 105–116), rectifying multi-element structures (e.g., R. T. Hebert, "Off-axis optical elements in integrated, injection-molded assemblies", *SPIE*, vol. 2600, December 1995, 129–134).

Devices with additional correction prisms require a rigid arrangement of the prisms and imaging optics elements relative to one another, which is disadvantageous particularly when installing the device within a predetermined volume. Further, the correction prisms are expensive to produce compared to round optics and have a relatively large mass which is disadvantageous for the total mass of the device. In addition, the chromatic aberration occurring in the arrangement limits the optical performance of a system of this kind. A description of the problems involved in the use of correction prisms is given by Stoltzmann et al. in their article "Versatile anamorphic electronic fingerprinting: Design and manufacturing considerations" (op.cit.).

Devices with telecentric imaging optics generally have low light power and therefore require a stronger illumination, high-sensitivity sensors or a long time for image generation and are therefore susceptible to interference during image acquisition. The different imaging scale in horizontal direction and vertical direction can be extensively corrected through the use of cylindrical lenses. However, like the large field lenses needed for telecentric imaging, cylindrical lenses are too expensive for applications with large recording areas.

In general, cylindrical optics are difficult to produce (and therefore expensive) and, above all, can not be corrected sufficiently to enable their use for forensic purposes.

The use of holographic surfaces as described, e.g., in "Prism fingerprint sensor that uses a holographic optical element", *Applied Optics*, vol. 35, September 1996, 5242–5245, is also only suitable for use with small recording areas such as for recording individual fingerprints, since it is difficult to connect them to the prism without defects and they drive up the cost of the device.

Displacement optics and inclination optics (see, e.g., R. T. Hebert, op.cit.) which are shaped into wave-guiding multi-element structures require the production of complex optical surfaces which are difficult to produce and are therefore expensive. In this case also, large-diameter lenses are required in order to achieve an acceptable light intensity of the system, and it is not possible to eliminate distortion completely.

OBJECT AND SUMMARY OF THE INVENTION

It is the primary object of the invention to find a novel possibility for recording intensity patterns occurring on a support surface according to the principle of frustrated total reflection which achieves a high-resolution, low-distortion image of the intensity pattern using simple optical arrangements. A further object consists in achieving a reproducible accuracy in image recording such that it is also suitable for forensic purposes for identification of parts of skin.

In an arrangement for low-distortion recording of intensity patterns occurring on a support surface through frustrated total reflection, comprising a light source, a prism having the support surface, and an image sensor, wherein the support surface illuminated by the light source is imaged on the sensor in such a way that light from the light source which is totally reflected at the support surface and whose total reflection is partially frustrated though contact with adjacent areas of a measurement object is imaged on the image sensor as an intensity pattern of the support surface, the above-stated object is met according to the invention in that only an imaging optical system is provided for imaging the support surface on the image sensor, and the image sensor is inclined opposite to the inclination of the support surface with respect to the axis of the optical system, so that an image of the support surface which is distorted but sharp in all parts of the image is present on the image sensor, in that the image sensor can record a quantity of image elements (pixels) that is substantially greater than the quantity that would be necessary for a resolution required in an output-side final image of the intensity pattern, and accordingly there is a data surplus with respect to the final image, and in that the image sensor is followed by a processing unit for electronic or mathematical rectification of image data by means of changing pixel centroid data based on displacement processes and/or operations for interpolating and averaging from the data surplus, wherein a rectification is carried out with low losses as a result of the number of image elements which is increased beyond the necessary number of image elements of the final image of the intensity pattern.

Insofar as it has different measurements in the two dimensions of the plane, has a longitudinal direction and a transverse direction and the longitudinal direction is the larger dimension, the support surface is advantageously oriented with the longitudinal direction parallel to a reflection plane defined by the incident and reflected light and extends perpendicular to the reflection plane, so that the image of the support surface fills an approximately square area of the image sensor, and the image of the support surface is imaged on the image sensor so as to be compressed in longitudinal direction and trapezoidally distorted in transverse direction.

The image of the support surface which is scanned by the image sensor has a quantity of pixels in both image dimensions that is greater by a factor of 1.1 than that quantity required for the desired resolution in the rectified final image.

Given an appreciable difference between the side lengths of the support surface, increased numbers of pixels up to a factor of 1.5 are preferably used in a scanning direction associated with the longitudinal direction of the support surface. For this purpose, the density of pixels that can be scanned by the image sensor in one dimension of its recording surface which is inclined relative to the optical axis of the optical system and associated with the longitudinal direction of the recording surface is advisably higher than the density of pixels that can be scanned in the other dimension of its support surface. There is a large variety of possible embodiment forms of the image sensor for implementing any selected scanning densities of the image sensor in order to achieve sufficient pixel densities in the final image on the output side.

In a first advantageous variant, the image sensor has a light-sensitive surface in the form of a receiver matrix (56). The receiver matrix (56) has a higher density of pixels in the dimension associated with the longitudinal direction of the support surface than in the other dimension.

In a second advisable possibility in which pixel densities differing in two dimensions are scanned by the image sensor, the image sensor has a receiver matrix (56) with uniform pixel spacing in both dimensions, and the receiver matrix (56) is displaceable by fractions of the matrix raster in order to implement a subpixel scanning in at least one dimension that is associated with the longitudinal direction of the support surface.

In this implementation of the image sensor, it is advantageous that the quantity of scanned pixels of the image can be adjusted in any desired manner with respect to the longitudinal direction and transverse direction of the support surface by a two-dimensional microscan process of subpixel scans of the image.

However, the quantity of scanned pixels of the image with respect to the longitudinal direction and transverse direction of the support surface is adjustable in any desired manner, also in any desired construction of the receiver matrix, advisably by means of a two-dimensional microscan process with a different quantity of subpixel scans of the image, wherein an increased quantity of steps in the dimension of the image associated with the longitudinal direction of the support surface is adapted to the compression of the image in this dimension.

A third advantageous design of the image sensor with different densities of the pixels of the light-sensitive surface in the two surface dimensions consists in that the image sensor has a receiver line in the dimension of the light-sensitive surface associated with the transverse direction of the support surface, this receiver line being moved by a scanning step size that is adapted to the reduction of the image in longitudinal direction of the support surface. The receiver line can preferably be moved by a successively changed scanning step size that is adapted to the actual compression of the image in order to carry out rectification in this dimension in a completely electronic manner, i.e., by means of a tighter, at times overlapping scanning and subsequent storage in a conventional, metrically organized image storage (with equidistant pixel locations).

The quantity of pixels in the image that are scanned by the image sensor in relation to the ratio of transverse direction to longitudinal direction of the support surface advisably has a ratio of between 0.5 and 1 in the variants of the image sensor mentioned above. The ratio is preferably 0.9.

Prisms with different refractive indexes can advantageously be used to adapt different ratios of longitudinal direction to transverse direction of the support surface to the dimensions of the light-sensitive surface of the image sensor. Different angles of total reflection at the support surface and, therefore, different degrees of compression of the image of the support surface on the image sensor can be adjusted by exchanging prisms with different refractive indexes. In order to minimize the space requirement for the optical imaging of the support surface on the light-sensitive surface of the image sensor, beam deflecting elements are advisably provided in the optical beam path between the support surface of the prism and the image sensor to fold the beam path so as to economize on space.

Further, in a method for recording intensity patterns occurring on a support surface through frustrated total reflection in which the total reflection at the support surface is partially frustrated through contact with adjacent areas of a measured object, the above-stated object of the invention is met through the following steps:

homogeneous illumination of the support surface by a light source at an angle of total reflection;

imaging of the support surface on an image sensor in such a way that an image of the support surface is generated on the image sensor as an intensity pattern only by an imaging optical system, so that the image on the image sensor is distorted but is sharply imaged in all parts of the image and light from the light source which is totally reflected at the support surface enters the optical system, recording of the image of the support surface by the image sensor with substantially more image elements (pixels) than those required for the desired resolution in the output-side final image of the intensity pattern, so that there is a data surplus over the required resolution of the final output image, and rectification of the optoelectronically converted, trapezoidally distorted image by mean of electronic or mathematical rectification of image data based on the data surplus occurring as a result of the increased quantity of recorded pixels, by changing pixel centroid data by means of displacement processes and/or interpolating and averaging operations for generating combined pixel data.

The optoelectronically converted, trapezoidally distorted image is advantageously rectified by means of electronic timed displacement and interlacing of pixel data streams in the course of reading out and storing an image, wherein the data surplus resulting from the increased quantity of recorded pixels is used for generating corrected pixel points. The image is preferably scanned by a receiver line in scanning steps of different sizes in a first dimension of the image sensor which is inclined relative to the axis of the optical system, wherein the size of the scanning steps is changed successively during a scan of the complete image of the support surface in accordance with the actual compression of the image, and the optoelectronically converted image is electronically rectified by metric, line-correct interlacing of the data streams of rows of pixels and altered clocking of the data streams of rows of pixels of the image which have different lengths to condensed lines with uniform pixel numbers.

In a second advantageous variant of the method, the optoelectronically converted, trapezoidally distorted image from the data surplus resulting from the increased quantity of recorded pixels is rectified solely by means of calculating combined pixel data corresponding to the desired pixel raster of the final output image based on interpolating and averaging operations. The image of the support surface is advantageously scanned by a receiver matrix in both dimensions of the matrix in subpixel steps for increasing the scanning density, and the electronically converted image is rectified by electronic line-correct interlacing and subsequent calculation of corrected pixel data which correspond to the metric pixel number of the desired final image and involve averaging and interpolation of signal percentages of adjacent pixels based on a pixel combination.

For this purpose, the image is advisably more tightly scanned in a dimension of the receiver matrix that is inclined relative to the axis of the optical system in order to partially compensate for a relatively smaller scanning density in longitudinal direction of the support surface due to the compression of the image.

However, a two-dimensionally uniform (n×n) subpixel displacement can also be applied as a scanning pattern of the receiver matrix without loss of resolution when a sufficiently high scanning density is selected corresponding to the compression of the image and the compensation of compression is carried out solely through calculation of the combined pixels for the final image.

In a third arrangement of the method, the optoelectronically converted, trapezoidally distorted image can be rectified based on the data surplus resulting from the increased quantity of recorded pixels also by means of a combination of electronic displacing processes and calculation of combined pixel data through mathematical interpolating and averaging operations.

The scanning of the image in the first dimension which is inclined relative to the axis of the optical system is advantageously carried out with a higher density of the lines of a receiver matrix compared to the second dimension, wherein the image is stretched in said first dimension at least to a substantial extent electronically (i.e., by tighter image scanning and elongation by way of metric storage) and the complete rectification is carried out by means of calculating combined pixel data. Receiver matrices with different distances between the light-sensitive elements in the column direction and line direction, symmetric receiver matrices with suitable displacing devices for (m×n) subpixel scanning and a receiver line which is moved mechanically in direction of the first dimension can be used to achieve different scanning densities (pixel numbers) in the two dimensions of the image.

The fundamental idea of the invention is based on the consideration that an optical correction of the imaging distortion due to the oblique beam direction after total reflection at the support surface requires too much space because of the special optical systems that are required (prisms and cylindrical optics) and is uneconomical with respect to cost and adjustment. Therefore, the invention starts by modeling the distorted image which, in itself, can be described simply by a central projection and, accordingly, can be calculated mathematically in a simple manner and used for electronic and/or mathematical rectification of the image of the support surface. Therefore, only an image of the support surface in which all parts of the image are sharp is required according to the invention, and the rectification of the image is first begun by scanning the image with the image sensor. The basic prerequisite for low-loss (or even loss-free) rectification of the image of the support surface is a sufficiently high-resolution scanning of the distorted image of the support surface which provides sufficient starting points for the interpolating and averaging operations according to the invention during the rectification of the image. For this purpose, certain minimum requirements must be set for the scanning density. Determined scanning patterns or suitable mechanical conditions for the image sensor (unequal scanning densities in the two dimensions of the image) facilitate or reduce the correction calculations which are based essentially on a combination of scanned pixels of the image, this combination being carried out by taking into account the modeled distortion pattern and corresponding to the pixel raster which is required for the desired resolution in the final image to be outputted.

The invention makes it possible to realize an image recording of intensity patterns occurring on a support surface based on the principle of frustrated total reflection, which image recording generates a high-resolution, low-distortion image of the intensity pattern by means of simple optical apparatus. The weight of an arrangement according to the invention is essentially determined only by the prism, objective, image sensor, mechanical connection elements and the evaluating electronics (whose weight is negligible) and can accordingly be kept relatively small even with large support surfaces.

Further, due to the absence of any need for optical correction elements, the arrangement is not susceptible to alignment problems, so that it is very well suited for forensic purposes for identifying parts of the skin. Moreover, the absence of optical correction elements has a positive effect on the structural dimensions of the arrangement according to the invention because the optical beam path between the prism and optically imaging system can be used in any desired manner for deflection by plane mirrors.

The invention will be described more fully in the following with reference to embodiment examples.

DESCRIPTION OF THE PREFERRED EMBODIMENTS

Figure 1:
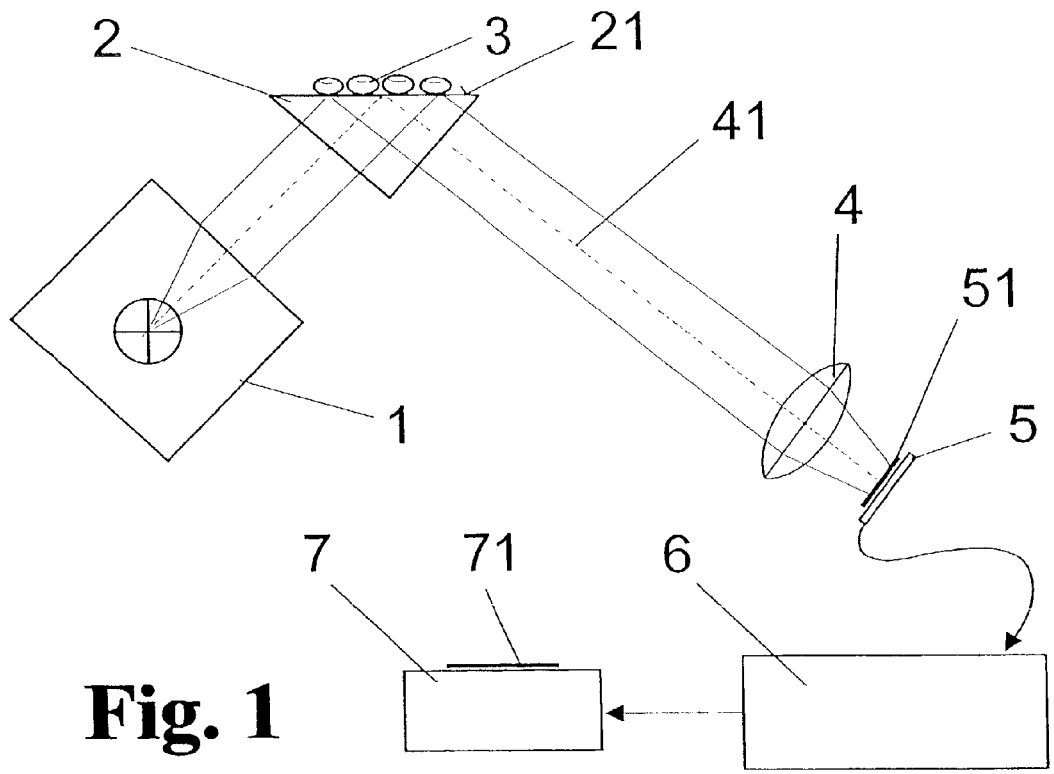
FIG. 1 is a schematic view of the invention with mathematical correction of a vertically compressed trapezoidal image of the support surface.

As is shown in FIG. 1, the basic construction of the arrangement according to the invention comprises a light source 1, a prism 2 with a support surface 21 with which a measurement object 3 (e.g., the fingers of a hand or other parts of human skin) is brought into contact, an optically imaging system, preferably a commonly available objective 4, and an image sensor 5. The objective 4 generates a sharp image of the support surface 21 on the image sensor 5 at an angle of the total reflection of the light coming from the light source 1. The image sensor 5 is followed by a rectification device 6 and an output unit 7.

Figure 2:
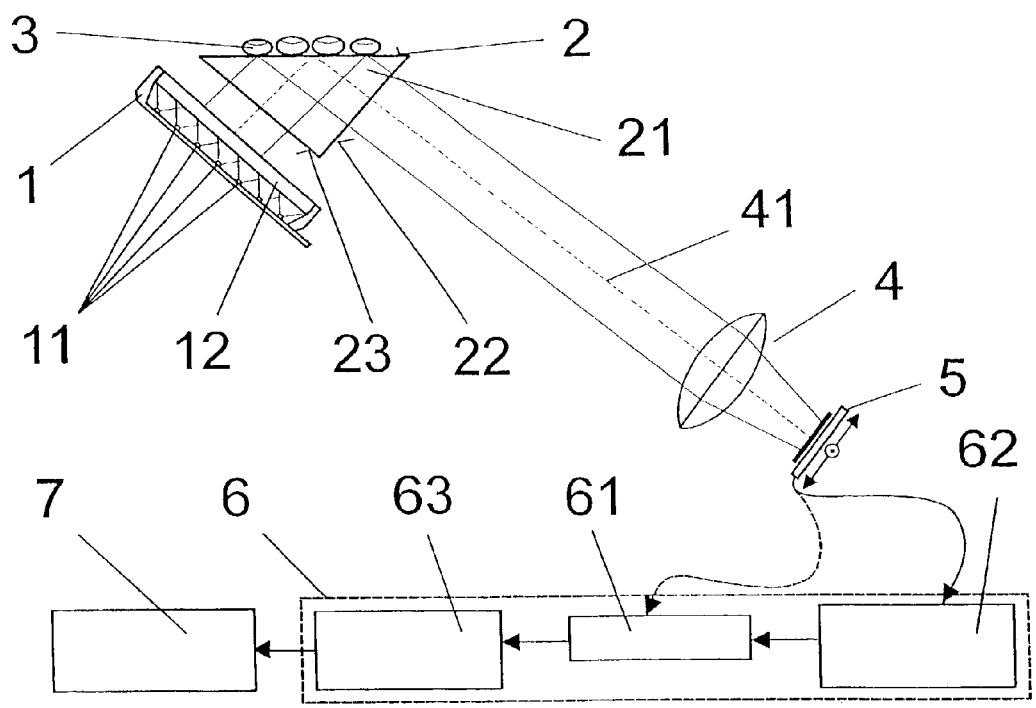
FIG. 2 is a schematic view of the invention with at least partial electronic correction of the compressed trapezoidal image of the support surface.

FIG. 2 shows a more specialized construction than that shown in FIG. 1. The rectification device 6 contains at least one image storage 61, an electronic rectification unit 62 being arranged in front of the latter, and a mathematical rectification unit 63. The electronic rectification unit 62 is closely linked with a scanning and readout unit 52 (which possibly also contains scanning mechanisms) associated with the image sensor 5. The rectification device 6 can have only an electronic rectification unit 62 or can contain only a mathematical rectification unit 63 or a combination of the two units 62 and 63 in succession. The necessary requirements for all three cases will be described below. The optical arrangement shown here contains the prism 2, preferably a 90-degree prism made of BK7, with its light entrance face 23 across from a surface light source 1 comprising widebeam LEDs 11 which are especially suited to uniform illumination and a scattering disk 12 of plastic, the objective 4 which is preferably a Tessar 4,5/50 or the like objective suitable for CCD applications or LCD projection, its modulation transfer function (MTF) being formed in such a way that structures in the size of the light-sensitive pixels of the sensor array are resolved by at least 10%, and an image sensor 5 with a square sensor surface, wherein a pixel raster which is greater in the x-direction dx than in the y-direction dy is used (as in FIG. 5). The support surface 21 of the prism 2 and the light exit face 22 are plane and finely polished optically.

The optical conditions for image recording will be discussed in more detail in the following.

The support surface 21 and the image sensor 5 are arranged so as to be oppositely inclined with respect to the optical axis 41 of the objective 4 (Scheimpflug) so that the support surface 21 is actually sharply imaged in all parts of the image. Due to the total internal reflection in the prism 2 which is frustrated at the contact points, an image 51 with high contrast and high resolution, but with perspective distortion, is formed on the image sensor 5. The optically distorted transfer results in a trapezoidal, vertically reduced but sharp image 51 of the support surface 21; in a substantially rectangular support surface 21, the height reduction is advisably effected in the longer dimension (hereinafter: first dimension in longitudinal direction of the support surface 21) so that the image 51 can be better adapted to the most readily available image sensors 5 with a square or approximately square light-sensitive receiver surface 53.

By changing the inclination of the optical axis 41 of the objective 4 relative to the support surface 21 of the prism 2, the perspective distortion (height reduction of the image 51 or length reduction of the support surface 21) can be changed depending on the focal length of the utilized objective 4. The dimensions of the image 51 and the height-width ratios of the light-sensitive receiver surface 53 (within the limits set by the principle of total internal reflection) can accordingly be adapted to one another. The light exit face 22 of the prism 2 is preferably designed in such a way that it is perpendicular to the optical axis 41 in order to prevent chromatic errors. However, this also means that the prism 2 is not necessarily a 90-degree prism.

On the other hand, slight deviations (at the expense of a chromatic error that can be kept small by a monochromatic light source 1) toward a greater angle between the support surface 21 and light exit face 22 of the prism 2 for a partially optical rectification (decreased of length reduction) of the image 51 are also possible and reasonable.

Figure 3:
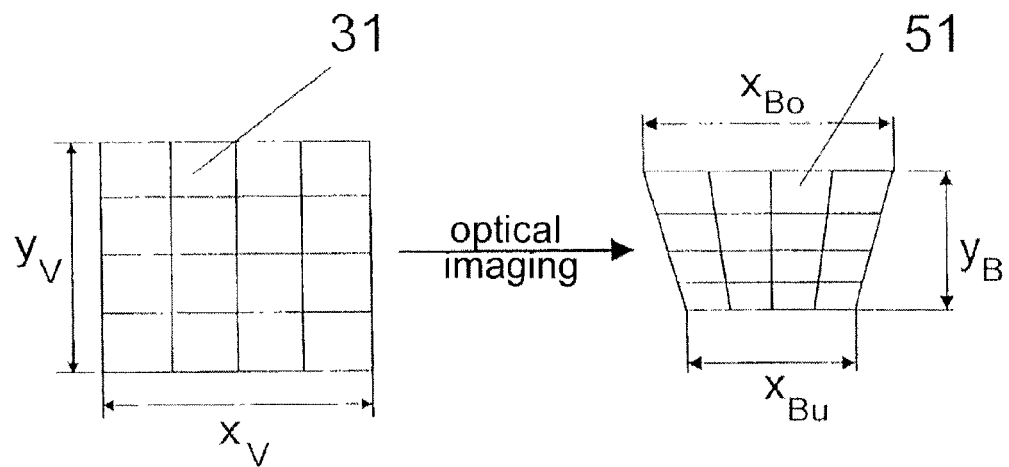
FIG. 3 shows a grid illustration of the distorted image compared to the rectangular support surface.

FIG. 3 shows, on the left-hand side, a rectangular template 31 with a width $x_v$ and a height $y_v$ which is arranged on the support surface 21 of the prism 2 and is imaged on the image sensor 5 by the objective 4. Regular grid lines are drawn in the template 31, in addition, to illustrate the transfer function from the template 31 to the image sensor 5. These grid lines show particularly clearly that the image 51 shown at right in FIG. 3 is trapezoidally distorted with a smaller bottom width $x_{Bu}$ and a larger upper width $x_{Bo}$, and the height of the trapezoid shape is additionally compressed in y-direction by a factor of about 1.4. This factor makes it possible to adapt a preferably elongated rectangular shape of the support surface 21 (e.g., for recording four-finger prints, full handprints or footprints) to the commercially available, approximately square shape of the light-sensitive receiver surface 53 in order to make use of the image sensor 5 to the fullest extent. Therefore, the plane of total reflection which is described by the directions of incident light and the light that is totally reflected at the support surface 21 and which extends parallel to the drawing plane in FIGS. 1 and 2 is preferably oriented in direction of the greatest extension of the support surface 21 on the prism 2.

Figure 4:
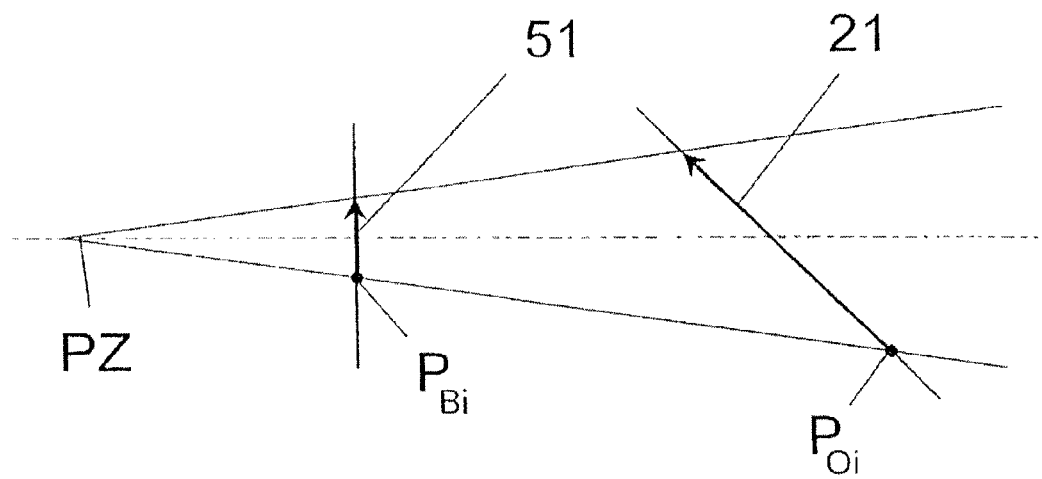
FIG. 4 shows the approach, according to the invention, for the reversibly unique correlation of the pixels of the distorted image with the pixels of the rectified final image through central projection.

FIG. 4, which shows a schematic view of a one-dimensional central projection, shows the solution for correcting the distortion of the image 51 shown in FIG. 3 compared to the template 31. This solution is applied two-dimensionally for rectification of the image 51. Assuming a projection center PZ, all of the image points (pixels) $P_{Bi}$ on the receiver surface 53 of the image sensor 5 are associated in a bi-unique correspondence with a determined object point $P_{Oi}$. The two-dimensional description of this relationship by means of mathematical matrices provides a solution for rectification of the image 51 which is easily manageable mathematically.

Since the light-sensitive elements 54 of the image sensor 5 are in a discrete arrangement, it is necessary to determine percentages of the charge quantities (proportional to the incident light) to a gray scale value of a targeted discrete pixel (image element surface) in the corrected final output image during or after the rectification by mean of centroid methods or other methods (interpolation and averaging methods) from a quantity of surrounding pixels, wherein the size of the pixels of the final image is given by the desired resolution in the final image (in the output unit 7).

A substantially greater quantity of scanning points, i.e., of light-sensitive elements 54 of the image sensor 5 illuminated by the image 51, is required in image 51 compared to the desired quantity of pixels in the final image so that the rectification of the image 51 can be carried out without loss of information, i.e., without pixels that are based on a quantity of pixels per area unit in the image 51 that is less than the quantity in the final image 71 being calculated through interpolation for a particular area unit of the final image 71. This is necessary particularly in the direction toward a reduction of the height of the image 51 with respect to the longitudinal direction of the support surface 21.

Figure 5:
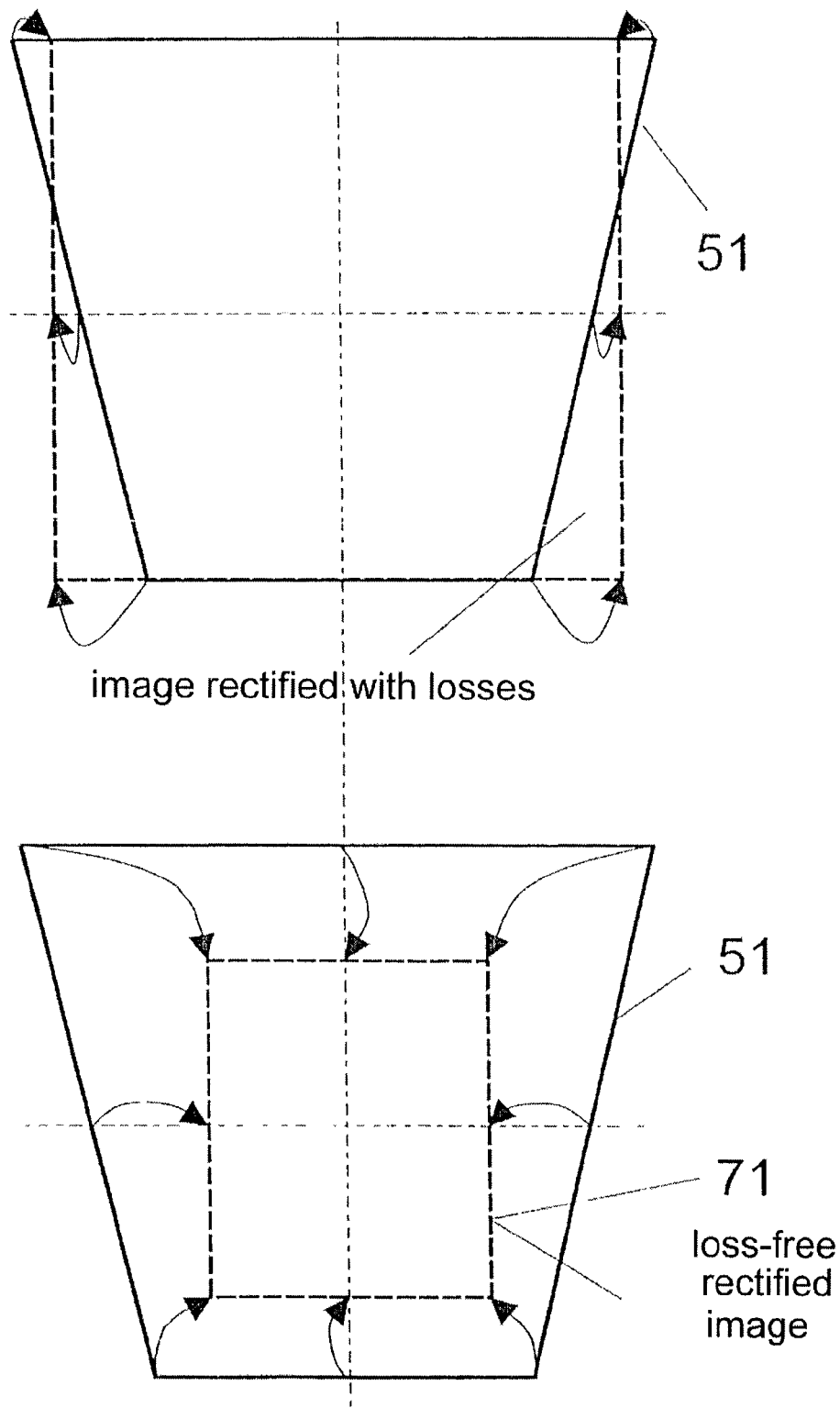
FIG. 5 is a schematic view showing the rectification, according to the invention, based on the central projection considered in direction of the optical axis and a comparison to conventional lossy rectification.

FIG. 5 is an impressive illustration of the principle of low-loss rectification according to the invention (or even loss-free rectification according to the mathematical principle of central projection) in comparison to a conventional lossy rectification of trapezoidal distortion. As can be gathered from the following description of FIG. 5, the principle of mathematical rectification according to the invention is a further compression of the recorded (illuminated) pixels 55 of the image 51 (also called image data in the following) which takes the distortion into account.

The method applied in the rectification can also be carried out in two steps in that first one dimension and then the other dimension is rectified. With a loss-free rectification, it is assumed that the distorted image 51 has more pixels in both dimensions and is therefore larger than the rectified final image 71. Due to the unique correspondence between the pixels in image 51 and the pixels in the rectified final image 71, it is possible to transform the pixels of the distorted image 51 to the pixels in the final image 71 without significant loss of the required information because there is a surplus of information in the image 51 due to the greater scanning density. In conventional rectification of trapezoidal distortion as is shown in the upper part of FIG. 5, correction leads to losses because the information for more than one pixel in the rectified image is obtained, at least in parts of the image 51, from one pixel in the distorted image 51. This means that the scanned image information is stretched and not every pixel in the rectified image carries the defined discrete information needed for the required resolution.

The rectification according to the invention is carried out specifically in the following way:

homogeneous illumination of the support surface 21 with a light source 1 at an angle of total reflection, imaging of the support surface 21 on an image sensor 5 in such a way that an image of the support surface is generated on the image sensor 5 as an intensity pattern only via an imaging optical system 4, so that the image 51 on the image sensor 5 is distorted but is sharply imaged in all parts of the image and light from the light source 1 which is totally reflected at the support surface 21 enters the optical system 4 parallel to the optical axis 41, recording of the image 51 of the support surface 21 by the image sensor with substantially more image elements (pixels) than those required for the desired resolution in the output-side final image of the intensity pattern, and rectification of the optoelectronically converted, trapezoidally distorted image 51 by interpolating and averaging operations based on the generation of combined pixel data from a data surplus which exists as a result of the increased quantity of recorded pixels.

Depending on the refractive index of the glass of the prism 2, the focal length of the imaging optics 4 and the inclination of the support surface 21 relative to the optical axis 41 of the objective 4, the image 51 recorded by the image sensor 5 is compressed to various degrees and trapezoidally distorted. This distortion of the imaged support surface 21 is eliminated subsequently by an optoelectronic and/or mathematical rectification/correction.

Figure 6:
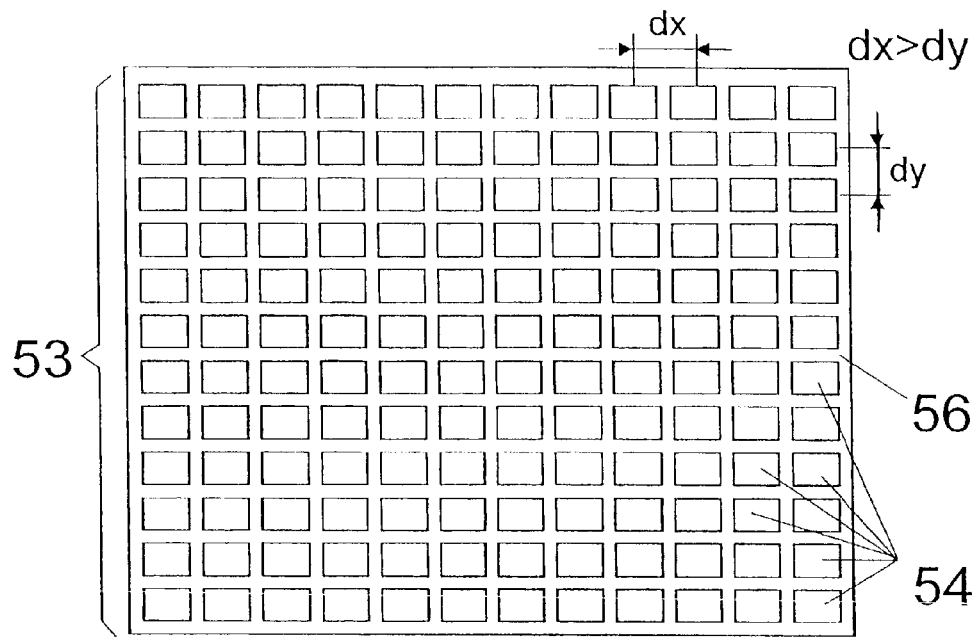
FIG. 6 shows a variant of the invention with partial electronic rectification of the image by means of different scanning densities in the two dimensions of the image sensor.

In a first example illustrated with reference to the view in FIG. 6, the distortion is selected in such a way that it is at least partially canceled and the height-width ratios of the support surface 21 and receiver surface 53 are optimally adapted to one another through different dimensions of the sensor elements 54 of the image sensor 5 in vertical direction and horizontal direction (or, in case of sensor arrangements with mechanical sensor displacement, through a different quantity of scanning steps in horizontal direction and vertical direction).

Further, the quantity of sensor elements 54 of the image sensor 5 is selected in such a way that the image sensor 5 supplies more image points per area unit than are required for the corrected (rectified) final image 71. The higher information density obtained in this way is a necessary prerequisite for the subsequent electronic or mathematical correction of distortion in order to minimize information loss and prevent decreased resolution. For this purpose, the image sensor 5 is designed in such a way that it has a shorter (center) distance (hereinafter also pixel raster) dy between the sensor elements 54 in direction of the compressed first dimension (y-direction) of the image 51 than in the other direction with pixel spacing dx.

When a mechanically scanning system is used instead of a matrix receiver as an equivalent image recording device, scanning steps which are greater in number and closer together must be carried out in y-direction analogous to the matrix scan, so that a smaller pixel raster dy occurs in the same manner in the mechanically scanned y-direction.

The compression of the first dimension (longitudinal dimension) of the recording surface 21 is used in such a way that any support surfaces 21 with clearly unequal side lengths can be imaged on square or approximately square image sensors 5. Of course, rectangular sensor arrangements can also be used when certain groups of sensor elements remain unused (unexposed) from the start.

A particularly suitable image sensor 5 is a CCD matrix 56 (SONY, type ICX055) with 500×582 pixels and a pixel raster of 9.8×6.3 $\mu m^2$. However, other CCD matrices or CMOS matrices are also suitable.

The image 51 of the support surface 21 is compressed approximately by a factor of 1.4 in longitudinal direction by the perspective distortion during imaging. The smaller pixel raster in the y-direction partially cancels this distortion, but by a constant factor. Accordingly, a residual distortion remains in the y-direction. This must be compensated by subsequent mathematical operations.

The distortion in x-direction can be eliminated by electronic methods or by mathematical operations in a method step with the residual distortion in y-direction.

Figure 7:
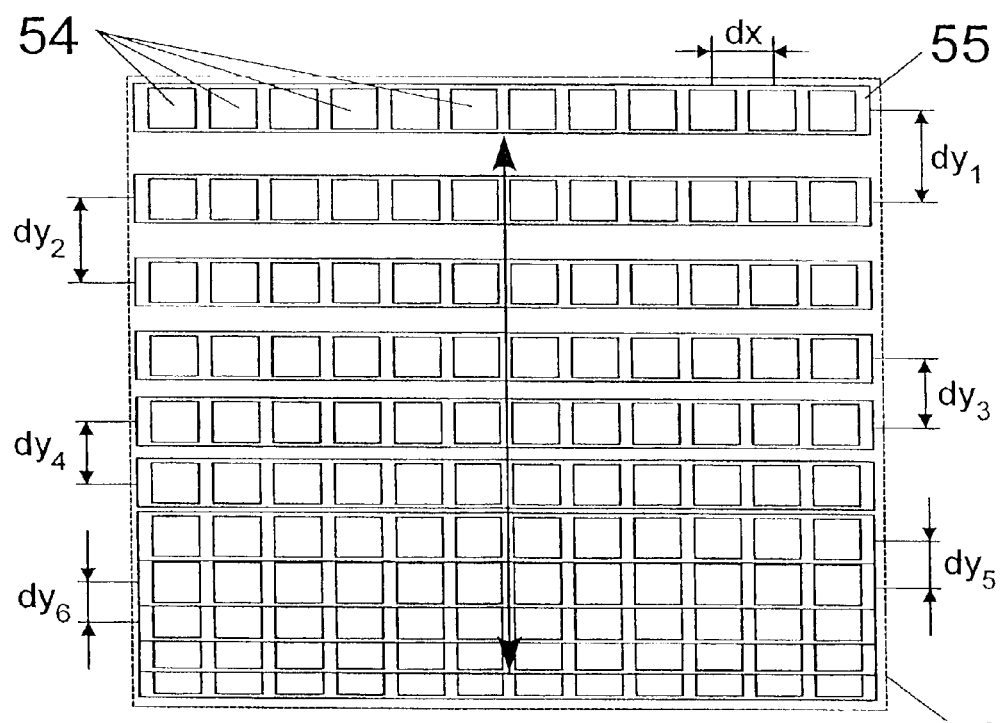
FIG. 7 shows a variant of the invention in which a complete electronic rectification of the image is carried out by inhomogeneous scanning densities in one dimension of the image sensor and subsequent different readout pulses in the other dimension.

A completely electronic elimination of the compression of the image 51 in y-direction is possible by means of mechanically scanning the image 51 by a receiver line 55, as is shown schematically in FIG. 7. The receiver line 55 has enough pixels that at least the resolution in the x-direction required for the entire system is achieved everywhere in the final image 71 with loss-free rectification and that the scanning is carried out with a much higher resolution in order to achieve a redundancy of the pixel calculations in the final image 71 when correcting by interpolating and averaging operations. In principle, any receiver line 55 with a sufficient number of light-sensitive elements 54 which has at least 10% more elements than the pixels that are required in the corresponding dimension of the final image 71 is suitable for this purpose. The receiver line 55 is displaced by steps or continuously in the image plane of the objective 4 orthogonal to its longitudinal dimension.

As a result of the perspective distortion occurring during imaging, the image 51 of the support surface 21 is compressed orthogonal to the orientation of the receiver line 55 by a factor of about 1.4. Accordingly, there is a height-width ratio of 1:0.77 in the image 51.

By appropriate selection of the scanning step size for the movement of the receiver line 55 such that the scanning step size dy (shown in FIG. 7) becomes increasingly smaller from the top to the bottom by dy1>dy2>dy3> . . . >dyi corresponding to the loss in resolution due to the perspective distortion in y-direction, the perspective distortion in y-direction can be completely eliminated in a simple manner in the subsequent image storage 61 due to the hypothetical uniform pixel raster. This procedure corresponds to the completely electronic rectification in a first dimension (y-direction) which has already been mentioned a number of times.

When using a receiver line 55 which moves continuously in y-direction, the movement speed is adapted in an analogous manner.

As a result of this special mechanical scanning procedure, an image 51 is formed which is completely rectified in y-direction, but is still distorted in x-direction to various extents depending on the y-position. This distortion in x-direction is subsequently completely eliminated almost without losses either by means of electronic correction or—as is described more fully in the following (FIG. 9)—by mathematical operations in the form of a mathematical correlation of a larger number of pixels to a smaller number of pixels of the final image 71.

The above-mentioned electronic correction in the line direction (x-direction) of the receiver line 55 uses the analog output signal of the receiver line 55 to which a determined pixel correlation is allotted by timing arrangements in the original circuitry. Based on the data surplus resulting from the appreciably larger selected quantity of light-sensitive elements 54 of the receiver line 55 compared to the required pixel number (resolution) in the final image 71, the analog output signal is subjected to a new timing arrangement with known magnitude of the trapezoidal distortion (based on the modeling of the imaging process according to FIG. 4) per line readout of the receiver line 55, and the clock frequency of this timing arrangement leads to the desired pixel number in the final image 71. The result is a completely electronically rectified image with full image quality of the imaged support surface 21.

In the following example, the description of an electronic rectification by different scanning densities in the different image dimensions is omitted, although this can be implicitly contained by way of different pixel rasters. The description refers to a subpixel scanning according to FIG. 8. An n×n-microscan is assumed as applied for purposes of the image rectification according to the invention.

A CCD matrix 56 with 1300×1300 square pixels and a pixel raster of 6.7×6.7 μm² (e.g., SONY, type ICX085AL, or another suitable CCD matrix or CMOS matrix) is used as an image sensor 5. The matrix 56 which is shown schematically in FIG. 6 and which has light-sensitive elements 54 in a field of 8.71×6.9 mm² is arranged in such a way that the short side length is associated with the compressed first dimension (y-direction) of the image 51 (see the dimension of the image 51 that is visible in the drawing plane in FIG. 2).

With a support surface of 78×86 mm², the trapezoidal image 51 is imaged on the matrix 56 through the objective 4 and the occurring perspective distortion with a surrounding rectangle of 8.71×6.86 mm², which trapezoidal image 51 virtually corresponds to the field of the light-sensitive elements 54 on the matrix 56. An image 51 which makes full use of the matrix 56 with a height-width ratio of 1:0.79 is accordingly formed from the support surface 21 with a height-width ratio of approximately 1:1.1 by the imaging.

The resolution of at least 500 dpi that is usually required for forensic applications can only be achieved for the final image 71 of the support surface 21 with an arrangement of this kind when the matrix 56 is moved at least by a (2×2) microscan with a step size of ½ pixel spacing (in this case, 3.35 μm) in both directions (as is indicated by arrows at the image sensor 5 in FIG. 2, wherein the movement in y-direction is carried out as shown and the movement in x-direction is carried out vertical to the drawing plane).

Figure 8:
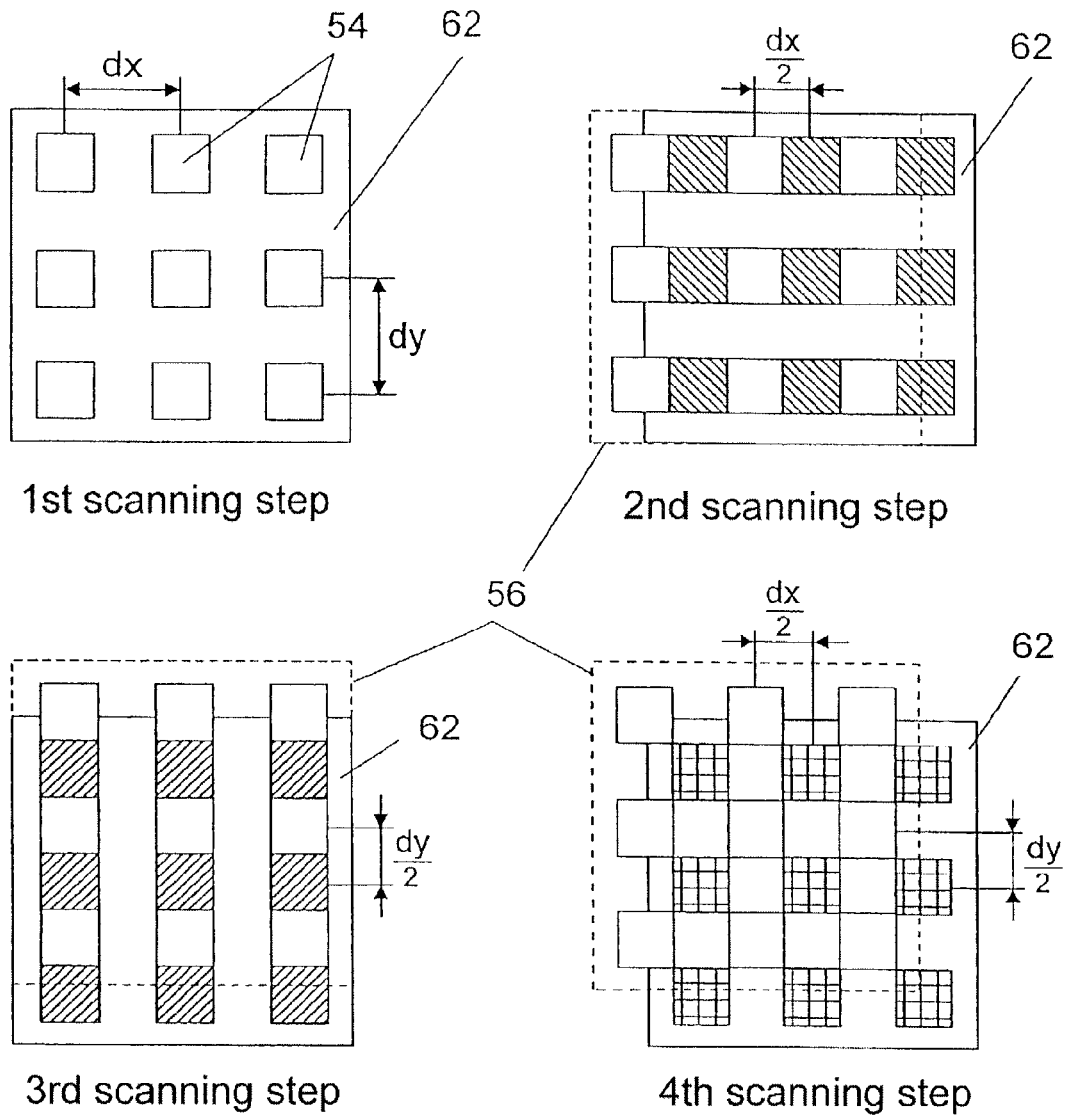
FIG. 8 shows a variant of the invention with a receiver matrix displaced in microscan steps for realizing a completely mathematical rectification and combined electronic and mathematical rectification.
Figure 8:
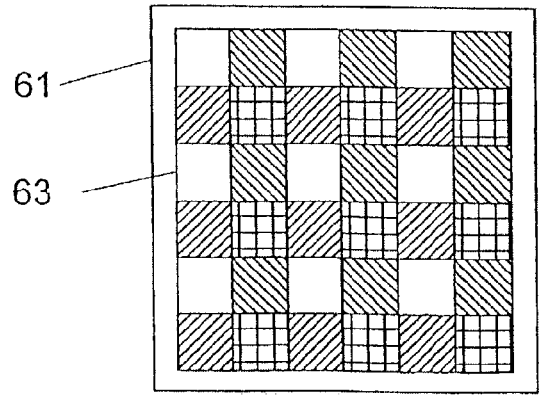

The five illustrations making up FIG. 8 show four reduced views of the scanning steps of a (2×2) microscan arranged in a square (with reference to the pixel number) and, below the dashed line, the interlaced resulting image 63. The partial images 62 which are obtained in four different positions and are characterized by differently filled light-sensitive elements 54 are subsequently interlaced in the image storage 61 to form a resulting image 63 (which is still trapezoidally distorted) with 2600×2060 pixels as is shown in a simplified view under the dashed line below the four partial images 62. The image area of the image 51 is scanned more tightly (in this case, continuously), i.e., the resolution in the image 51 is increased.

This trapezoidally distorted resulting image 63 is rectified mathematically in the rectification unit 6 (see FIG. 1) with a set of correction parameters that has been determined beforehand. With a required resolution of 500 dpi, a corrected final image 71 with approximately 1535×1690 pixels is obtained and is available in the output unit 7 for further processing (e.g., personal identification, forensic identify cards, etc.). Due to the quantity of pixels in the trapezoidally distorted, interlaced resulting image 63 that is greater by a factor of 1.69×1.22 than the necessary pixel number in the corrected final image 71, there exists the necessary data surplus for carrying out a transformation virtually without losses with respect to the required resolution (e.g., 500 dpi).

The rectification (described in the following with reference to FIG. 9) which is to be applied for this purpose and which is modeled mathematically through central projection can be combined with or supplemented by the electronic procedure already described in the examples given above.

The interlacing of the resulting image 63 by means of subpixel scanning using the example of the (2×2) microscan will be described with reference to FIG. 8. The illustration in the upper left-hand corner shows a section of the matrix 56 with nine light-sensitive elements 54 having a center distance (pixel raster) of dx and dy. A first partial image 62 is incorporated (scanned) which, in the illustration in the upper left-hand corner of FIG. 8 identified as "first scanning position", is regarded as signal values (data) of the nine pixel areas shown. The matrix 56 is then displaced by dx/2 from the first scanning position to a second scanning position (partial image 62 at upper right) by mechanical displacement. The light-sensitive elements 54 are accordingly displaced into an area that was previously not sensitive to light and a second partial image 62 is incorporated in a changed position in the form of new signal values (data) which are shown by light-sensitive elements 45 with hatching. Viewing the initial position of the matrix 56 together with the data from the second scanning step shows a doubled resolution in line direction (in this case, continuous scanning). The increased resolution can be generated in an analogous way in column direction (partial images 62 for the third and fourth scanning step) and is illustrated in the right-hand and left-hand views in the middle of FIG. 8. The view on the right shows the third scanning step and the view on the left shows the fourth scanning step. Viewing the fourth scanning step together with the initial position of the matrix 56 again clearly shows the doubled resolution in y-direction.

The resulting interlaced image 63 shown at the bottom of FIG. 8 which is composed from the four positions of the partial images 62
first scanning step: without hatching,
second scanning step: hatching slanted to the left,
third scanning step: checkered structure,
fourth scanning step: hatching slanted to the right, in correct manner with respect to lines and columns in the (2×2) microscan with light-equivalent signal values (data) according to the differently marked light-sensitive areas 54 has doubled resolution in both directions compared to the readout of a matrix 56 that is not moved by microsteps.

If necessary, the resolution can also be further increased by displacing the matrix 56 in 3, 4, . . . , n steps by x/3, x/4 . . . , x/n or in 3, 4, . . . , m steps by y/3, y/4, . . . , y/m depending on the ratio of the light-sensitive areas to the areas that are not light-sensitive.

Therefore, a preferable arrangement of the subpixel scanning in the form of a (n×m) microscan will be described separately in the following.

This example is based on a support surface 21 with dimensions of 130×143 mm². This support surface 21 is imaged (with reference to FIG. 2) via the objective 4 (Tessar 4,5/50), which has already been mentioned in detail above, in a trapezoidally distorted image 51 with a surrounding rectangle of 8.71×6.84 mm² on the image sensor 5. The rectangle enclosing the image 51 virtually fills the available area of the light-sensitive elements 54 of the matrix 56. The support surface 21 with a height-width ratio of 1:1.1 is accordingly converted through the optical imaging of the objective 4 into an image 51 which makes optimal use of the matrix 56 with a height-width ratio of 1:0.79.

A CCD matrix 56 (e.g., Sony, type ICX085AL or another suitable CCD matrix or CMOS matrix) with 1300×1030 square light-sensitive elements 54 and a pixel raster of 6.7×6.7 μm² is again used as an image sensor 5. As was the case with the (n×n) microscan, the matrix 56 is oriented with the short side length in the direction of compression (reduction of height) of the image 51 (i.e., in y-direction). A required resolution of 500 dpi in the corrected final image 71 can be achieved with an arrangement of this type from the distorted image only when the matrix 56 is moved by (at least) a 3×4 microscan with a step size of ⅓ pixel spacing (in this case, 2.233 μm) in three steps in x-direction and with a step size of ¼ pixel spacing (in this case, 1.675 μm) by four steps in y-direction. In principle, reference is had to the procedure shown in FIG. 8, wherein the quantity of microscan scanning steps increases to a total of twelve and a meander-shaped displacement pattern is preferably used. In contrast to the scanning pattern of the (2×2) microscan shown in FIG. 8, each of the partial images 62 which are accordingly obtained in twelve positions has overlaps of the individually scanned partial images 62, so that the obtained information leads to a higher resolution (a larger data surplus) than the (2×2) scan mentioned above. Therefore, the greater scanning density in y-direction is necessary for rectifying the compression of the image 51 without loss of information. The individual partial images 62 are interlaced in the image storage 61 correctly with respect to lines and columns, and the larger quantity of scanning steps in y-direction already results in a partial rectification (analogous to the partial elongation in y-direction described in FIG. 6). Due to the interlacing of the partial images 62, an image 63 which is still trapezoidally distorted results in the image storage 61 from approximately 3900×4120 pixels.

This high-resolution (due to the subpixel scanning of the image 51) resulting image 63 is now rectified by a previously determined set of correction parameters. With a required resolution of 500 dpi, the corrected final image 71 must comprise 2560×2815 pixels. Owing to the fact that the quantity of pixels in the interlaced resulting image 63 is 1.52×1.46-times greater than the necessary number of pixels in the corrected (rectified) final image 71, there is a sufficiently large surplus of information for carrying out a virtually loss-free transformation with respect to the desired resolution.

The trapezoidal distortion can be favorably detected mathematically and corrected in a simple manner by selecting a suitable set of correction parameters through image processing algorithms. The central projection which is illustrated one-dimensionally in FIG. 4 is used as a basis for providing the set of parameters. The mathematical correction offers the advantage of high flexibility and makes it possible to correct any pair of values of prisms 2 and image sensors 5 simply by changing the set of parameters and to output a final image 71 with the desired resolution in the output unit 7. The existing distortion of the resulting image 63 which is interlaced after the microscan can be carried out by electronic and/or mathematical operations with very low losses of image information based on the set of correction parameters which is determined either for a whole series of devices (with the same optical configuration) or, in case of very high requirements for geometric accuracy, for every individual device. The set of correction parameters is exactly determined, i.e., calibrated for every device, by applying an exactly known template 31 (e.g., analogous to FIG. 3) and measuring the distortion in the image 51 that has not been corrected.

The process of interpolating and averaging from the data surplus will be described in detail once again with reference to FIG. 9. The drawing shows the deposited geometric pattern of a high-resolution resulting image 63 which is provided by the image sensor 5 and interlaced correctly with respect to lines and columns. The question of whether or not a partial rectification has already taken place as a result of the scanning process and subsequent intermediate storage in the image storage 61 may be disregarded provided the correction (rectification) has not yet been completely carried out. The section of sixteen pixels shown in the drawing which were deposited in the image storage 61 in an order based on their metric position of the scanning points contains the upper left-hand corner of the scanned image 51 of the support surface 21. The sharp delimitation of the image 51 serves only as a simplified illustration. Pixels $P_{12}$ to $P_{14}$ and $P_{22}$ to $P_{42}$ will actually contain a smaller signal (of the recorded intensity) and accordingly indicate the edge of the image 51 in a sliding manner. There is a sufficient number of algorithms for edge detection known from the prior art for this purpose. A distribution pattern of the quantity and position (including the shape due to the distortion) required for the desired resolution in the final image 71 can be determined in a mathematically simple manner from the outline or contour of the image 51 (and, if necessary, from some additional features of the calibration model 31) by the above-mentioned principle of central projection and by making use of calibration models 31.

Figure 9:
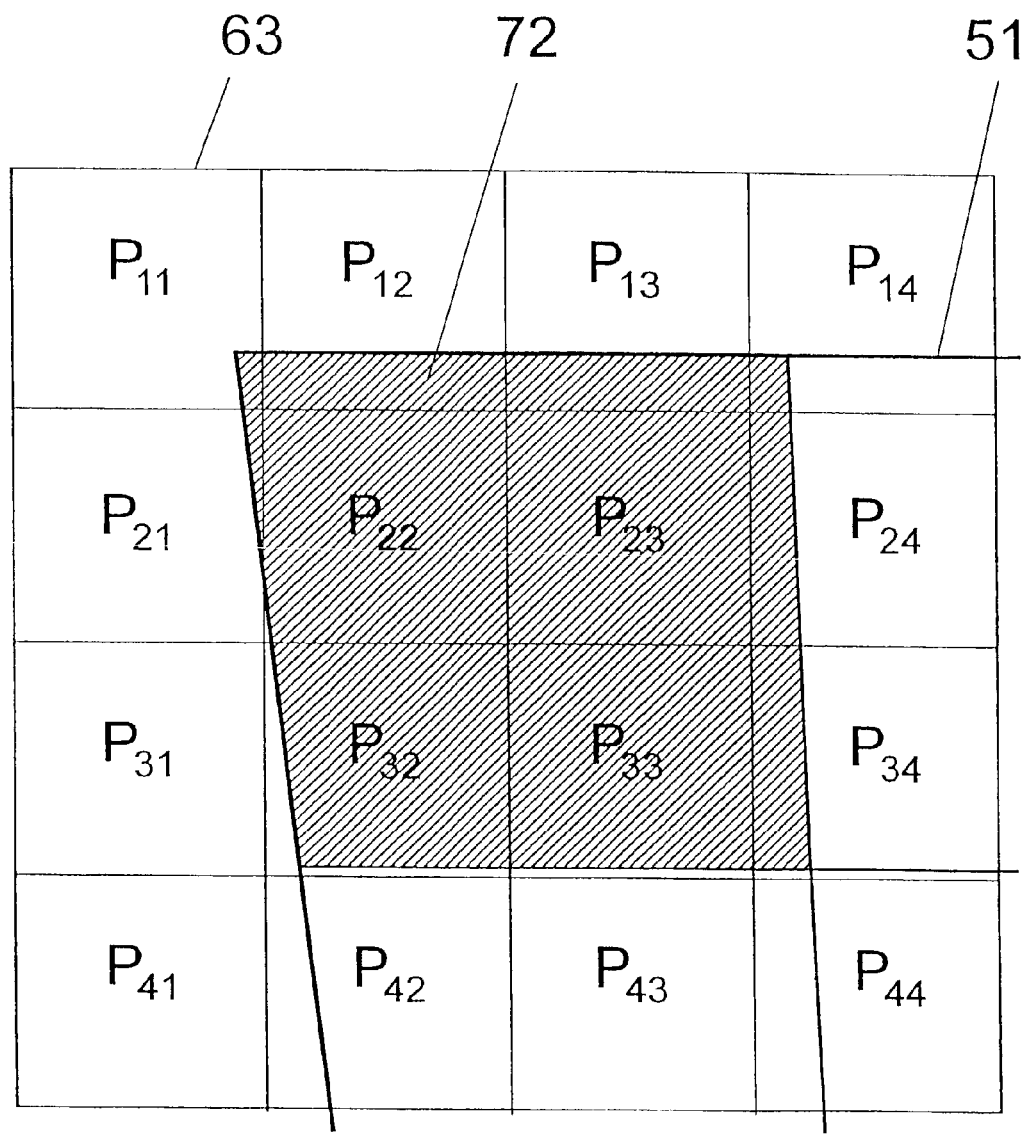
FIG. 9 shows the method of mathematical rectification through interpolation and averaging of surrounding pixels with reference to a highly magnified area element of the distorted image.

FIG. 9 shows a pixel determined in the manner described above as a shaded area for combining the information (pixel data) to be used for this purpose from the resulting image 61 which is deposited in the image storage 61 and which is already interlaced correctly with respect to line and columns. The information of the corrected pixel 72 (shown by hatching) in the final image 71 is now determined corresponding to the area proportions of the involved pixels $P_{12}$ to $P_{14}$, $P_{22}$ to $P_{24}$ and $P_{32}$ to $P_{34}$ of the resulting image 63 that has been stored intermediately by averaging operations of the stored pixel data and interpolation of the pixel centroid.

The pixels of the resulting image 63 needed for obtaining the final image 71, i.e., edge pixels that are not exposed by the trapezoidal image 51, can be used to transfer additional optical or processing information. Referring to the view in FIG. 9, these pixels would be, e.g., pixels $P_{31}$ and $P_{41}$.

Due to the fact that images 51 of the support surface 21 that are not optically corrected are processed solely by means of electronic and mathematical rectification in the procedure described above, heavy optical correction elements held in complicated adjustment mounts can be completely dispensed with in the arrangement according to the invention. The weight of an arrangement according to FIG. 1 or FIG. 2 is essentially determined only by the prism 2, objective 4, image sensor 5, mechanical connection elements (not shown) and the evaluating electronics (which are light in themselves) and can accordingly be kept relatively low even when the support surfaces 21 are large.

The arrangement is not susceptible to misalignment because it is no longer necessary to exactly adjust a large number of imaging elements and correcting elements. Readjustment is always carried out by adapting the set of correction parameters electronically and mathematically.

Since no other optical components need to be positioned between the prism 2 and objective 4, the beam path in this area can be deflected in any way by plane mirrors, so that small structural dimensions or installation in a given volume can be realized in an improved manner.

While the foregoing description and drawings represent the present invention, it will be obvious to those skilled in the art that various changes may be made therein without departing from the true spirit and scope of the present invention.

REFERENCE NUMBERS

1 light source
11 led
12 scattering disk
2 prism
21 support surface
22 light exit face
23 light entrance face
3 measurement object
31 template
4 objective
41 optical axis
5 image sensor
51 image (of the support surface)
52 scanning and readout unit
53 receiver surface
54 light-sensitive elements
55 line receiver
56 matrix
6 rectification device
61 image storage
62 electronic rectification unit
63 mathematical rectification unit
7 output unit
71 (corrected) final image
72 corrected pixel

What is claimed is:

1. An arrangement for low-distortion recording of intensity patterns occurring on a support surface through frustrated total reflection, comprising:
   a light source;
   a prism having a support surface; and
   an image sensor;
   said support surface illuminated by the light source being imaged on the sensor in such a way that light from the light source which is totally reflected at the support surface and whose total reflection is partially frustrated though contact with adjacent areas of a measurement object being imaged on the image sensor as an intensity pattern of the support surface;
   only an imaging optical system being provided for imaging said support surface on the image sensor;
   said image sensor being inclined opposite to the inclination of the support surface with respect to the axis of the optical system, so that an image of the support surface which is distorted but sharp in all parts of the image is present on the image sensor;
   said image sensor being capable of recording a quantity of image elements (pixels) that is substantially greater than the quantity that would be necessary for a resolution required in an output-side final image of the intensity pattern so that there is a data surplus with respect to the final image; and
   a processing unit following said image sensor for electronic or mathematical rectification of image data by changing pixel centroid data based on displacement processes and/or operations for interpolating and averaging from the data surplus, wherein a rectification is carried out with low losses as a result of the number of pixels which is increased over the necessary number of pixels of the final image of the intensity pattern.

2. The arrangement according to claim 1, wherein the support surface, insofar as it has different measurements in the two dimensions of the plane, has a longitudinal direction and a transverse direction and the longitudinal direction is the larger dimension, is oriented with the longitudinal direction parallel to a reflection plane defined by the incident and reflected light and extends perpendicular to the reflection plane, so that the image of the support surface fills an approximately square area of the image sensor, and the image of the support surface is imaged on the image sensor so as to be compressed in longitudinal direction and trapezoidally distorted in transverse direction.

3. The arrangement according to claim 1, wherein the scanned image of the support surface has a quantity of pixels in both dimensions that is greater by a factor of 1.1 than that quantity required for the desired resolution in the rectified final image.

4. The arrangement according to claim 1, wherein the density of pixels that can be scanned by the image sensor in one dimension of its receiver surface which is inclined relative to the optical axis of the optical system and associated with the longitudinal direction of the support surface is higher than the density of pixels that can be scanned in the other dimension.

5. The arrangement according to claim 4, wherein the image sensor has a light-sensitive receiver surface with different densities of the light-sensitive elements in the two dimensions, wherein the receiver surface is a matrix and has a higher density of light-sensitive elements in a dimension associated with the longitudinal direction of the support surface than in the other dimension.

6. The arrangement according to claim 4, wherein the image sensor has a receiver surface with uniform pixel spacing in both dimensions, and the receiver surface is a matrix and is displaceable by fractions of the matrix raster (dx; dy) at least in one dimension associated with the longitudinal direction of the support surface in order to implement at least one subpixel scanning in this dimension.

7. The arrangement according to claim 3, wherein the quantity of scanned pixels of the image is adjustable in any desired manner with respect to the longitudinal direction and transverse direction of the support surface by a two-dimensional microscan process in the quantity of subpixel scans of the image.

8. The arrangement according to claim 4, wherein the quantity of scanned pixels of the image with respect to the longitudinal direction and transverse direction of the support surface is adjustable in any desired manner by a two-dimensional microscan process with a different quantity of subpixel scans of the image, wherein an increased quantity of scanning steps in the dimension of the image associated with the longitudinal direction of the support surface is adapted to the compression of the image in this dimension.

9. The arrangement according to claim 4, wherein the image sensor has a receiver surface with different densities of light-sensitive elements in both dimensions, wherein a receiver line is arranged in the dimension of the receiver surface associated with the transverse direction of the support surface and, in the dimension associated with the longitudinal direction of the support surface, this receiver line is moved by a scanning step size that is adapted to the reduction of the image in longitudinal direction of the support surface.

10. The arrangement according to claim 9, wherein the receiver line is moved by a successively decreasing scanning step size that is adapted to the actual compression of the image.

11. The arrangement according to claim 4, wherein the quantity of pixels in the image which are scanned by the image sensor in relation to the ratio of transverse direction to longitudinal direction of the support surface has a ratio of between 0.5 and 1.

12. The arrangement according to claim 1, wherein prisms with different refractive indexes are provided in order to adapt different ratios of longitudinal direction to transverse direction of the support surface to the dimensions of the receiver surface of the image sensor, wherein different angles of total reflection at the support surface and, therefore, different degrees of compression of the image of the support surface on the image sensor can be adjusted due to the different refractive indexes of selected prisms.

13. The arrangement according to claim 1, wherein beam deflecting elements are provided in the optical beam path between the support surface of the prism and the image sensor to fold the beam path so as to economize on space.

14. A method for recording intensity patterns occurring on a support surface through frustrated total reflection in which the total reflection at the support surface is partially frustrated through contact with adjacent areas of a measured object, comprising the following steps:

homogeneously illuminating a support surface by a light source at an angle of total reflection;

imaging the support surface on an image sensor in such a way that an image of the support surface is generated on the image sensor as an intensity pattern only by an imaging optical system, so that the image on the image sensor is distorted but is sharply imaged in all parts of the image and light from the light source which is totally reflected at the support surface enters the optical system;

recording the image of the support surface by the image sensor with substantially more image elements (pixels) than required for the desired resolution in the output-side final image of the intensity pattern; and rectifying the optoelectronically converted, trapezoidally distorted image by interpolating and averaging operations based on the generation of combined pixel data from a data surplus occurring as a result of the increased quantity of recorded pixels compared to the necessary number of pixels of a final image to be outputted.

15. The method of claim 14, further comprises step of rectifying the optoelectronically converted, trapezoidally distorted image by electronic timed displacement and interlacing of pixel data streams in the course of reading out and storing an image, wherein the data surplus resulting from the increased quantity of recorded pixels compared with the necessary number of pixels of a final image to be outputted is used for generating corrected pixel correspondences.

16. The method according to claim 15, wherein the image is scanned by a receiver line in scanning steps of different sizes in a first dimension of the image sensor which is inclined relative to the axis of the optical system, wherein the size of the scanning step is changed successively during a scan of the complete image of the support surface in accordance with the actual compression of the image, and the optoelectronically converted image is electronically rectified by line-correct interlacing of pixel data streams and altered timing of the line data streams of lines of the image which have different lengths to condensed lines with uniform pixel numbers.

17. The method according to claim 16, wherein the scanning of the image in the second dimension oriented orthogonal to the axis of the optical system is carried out by a receiver line which is mechanically displaced in the first dimension that is inclined relative to the axis of the optical system.

18. The method according to claim 14, wherein the optoelectronically converted, trapezoidally distorted image from the data surplus resulting from the increased quantity of recorded pixels is rectified solely by calculating combined pixel data corresponding to the desired pixel raster of the final image on the output side based on interpolating and averaging operations.

19. The method according to claim 18, wherein the image of the support surface is scanned by a receiver matrix in at least one dimension of the matrix in subpixel steps, and the electronically converted image is rectified by electronic line-correct and column-correct interlacing and subsequent calculation of corrected pixel data which correspond to the metric pixel number of the desired final image and involve averaging and interpolation of signal percentages of adjacent pixels based on a pixel combination.

20. The method according to claim 19, wherein the image is more tightly scanned in a dimension of the matrix that is inclined relative to the axis of the optical system.

21. The method according to claim 19, wherein the image is scanned by a two-dimensionally uniform subpixel displacement of the matrix, wherein the scanning density is selected corresponding to the compression of the image occurring in the dimension of the matrix which is inclined relative to the axis of the optical system so as to be sufficiently great that it exceeds at least the number of pixels required in the final image on the output side when rectifying the compression, and the compression is rectified in the calculation of the combined pixels for the final image.

22. The method according to claim 14, wherein the optoelectronically converted, trapezoidally distorted image is rectified based on the data surplus resulting from the increased quantity of recorded pixels by a combination of electronic displacing processes and calculation of combined pixel data through mathematical interpolating and averaging operations.

23. The method according to claim 22, wherein the image in the first dimension which is inclined relative to the axis of the optical system is scanned with a higher density compared to the second dimension, wherein the image is stretched in said first dimension at least to a substantial extent electronically by suitable scanning and storage processes, and the complete rectification is carried out by calculating combined pixel data.

24. The method according to claim 23, wherein the image is scanned with a receiver matrix having a smaller spacing between the light-sensitive elements in the column direction than in the line direction.

25. The method according to claim 23, wherein the image is scanned with a symmetrical matrix, wherein the matrix executes a subpixel scan by a suitable displacing device in the first dimension which is inclined relative to the axis of the optical system with a greater quantity of scanning steps than in the second dimension.

26. The method according to claim 23, wherein the image is scanned by a receiver line in the second dimension which is oriented orthogonal to the axis of the optical system, and the receiver line is mechanically displaced in the first dimension which is inclined relative to the axis of the optical system, wherein the receiver line is moved by scanning steps which are smaller than the distances between the light-sensitive elements in the line direction.

27. The method according to claim 26, wherein the receiver line is moved in the first dimension by scanning steps which are smaller than the distances between the light-sensitive elements in the line direction and which are adapted successively in step size corresponding to the actual compression of the image.

* * * * *